United States Patent
Tompkins

[11] 3,780,510
[45] Dec. 25, 1973

[54] SHAKER HEAD
[75] Inventor: Neil R. Tompkins, Yuba City, Calif.
[73] Assignee: Halsey Harvester & Supply Co., Inc., Colusa, Calif.
[22] Filed: Jan. 31, 1972
[21] Appl. No.: 221,893

[52] U.S. Cl. .............................. 56/328 TS, 74/87
[51] Int. Cl............................................ A01g 19/00
[58] Field of Search .................... 56/328 TS; 74/87

[56] References Cited
UNITED STATES PATENTS

| | | | |
|---|---|---|---|
| 3,596,455 | 8/1971 | Adrian | 56/328 TS X |
| 3,221,567 | 12/1965 | Brandt, Jr. | 56/328 TS |
| 3,623,308 | 11/1971 | Nye | 56/328 TS |
| 3,163,458 | 12/1964 | Brandt, Jr. | 56/328 TS |
| 3,460,329 | 8/1969 | Overstreet, Jr. | 56/328 TS |
| 3,220,268 | 11/1965 | Brandt, Jr. | 56/328 TS X |
| 3,548,578 | 12/1970 | Shipley, Jr. | 56/328 TS |
| 3,020,695 | 2/1962 | Gould et al. | 56/328 TS |
| 3,021,168 | 2/1962 | Bodine | 56/328 TS |
| 3,248,865 | 5/1966 | Gerrans | 56/328 TS |
| 3,120,091 | 2/1964 | Gould et al. | 56/328 TS |
| 3,077,721 | 2/1963 | Balsbaugh | 56/328 TS |

Primary Examiner—Louis G. Mancene
Assistant Examiner—J. A. Oliff
Attorney—Herbert A. Huebner et al.

[57] ABSTRACT

A mechanical shaker head particularly suited for use in dislodging tree-borne objects such as fruits and nuts. The shaker head is characterized by a frame pivotally coupled to the distal end of a transportable boom and having supported therein a carriage from which is extended an operable clamp for grasping a selected portion of a given tree, and force generating means characterized by a pair of counter-rotating masses driven at a common tangential velocity, about a common axis of rotation, and at different angular velocities for periodically applying radially directed shock to the carriage through 360° of stepped progression, so that a vibratory motion is transmitted to components of the given tree, whereby the tree-borne objects are dislodged in response to the vibratory motion imparted to the shaker head by the force generating means.

4 Claims, 11 Drawing Figures

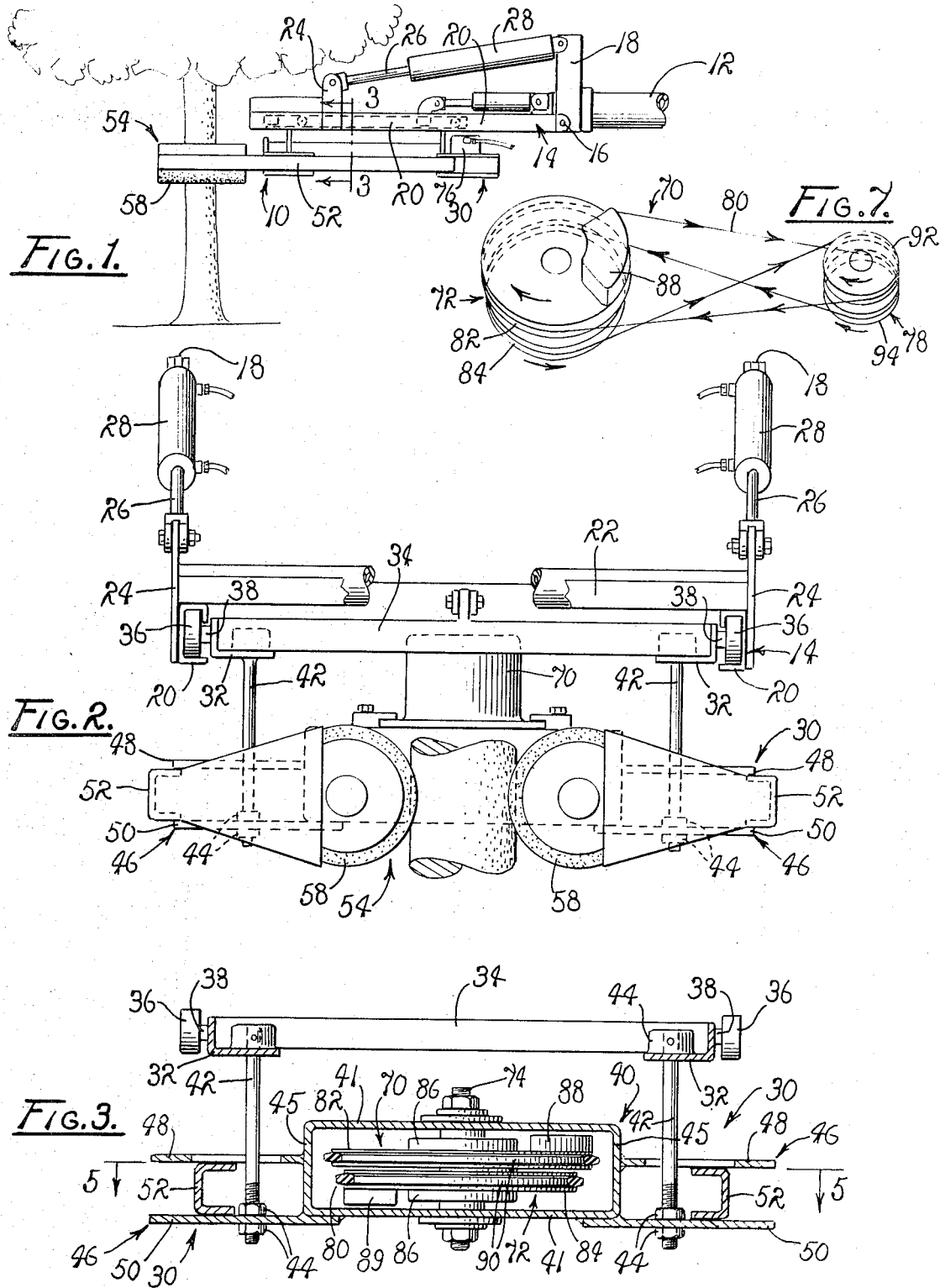

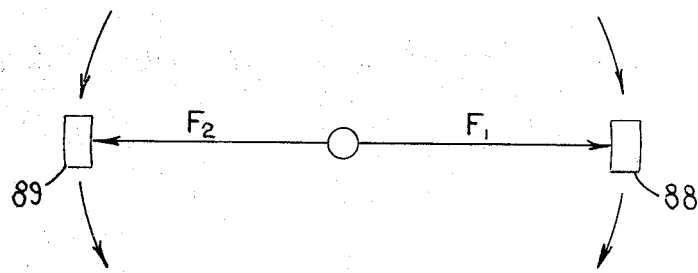
FIG. 8A.
$F_T = (+F_1) + (-F_2)$
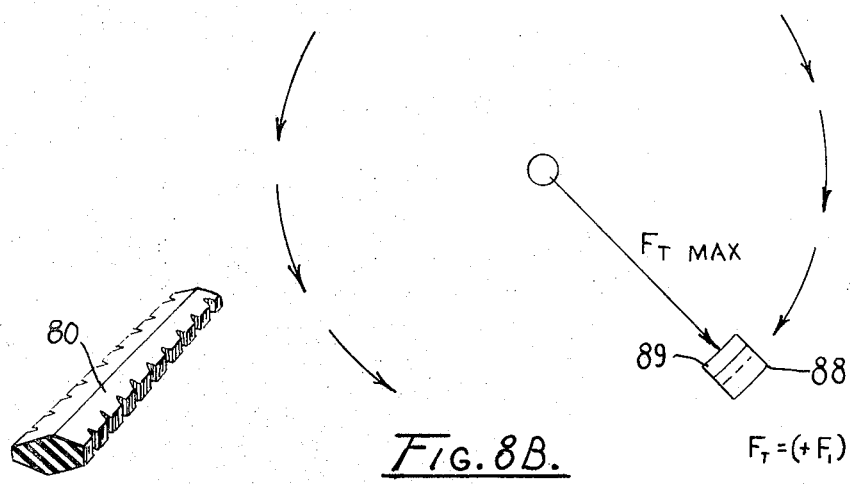
FIG. 8B.
$F_T = (+F_1) + (+F_2)$
FIG. 10.
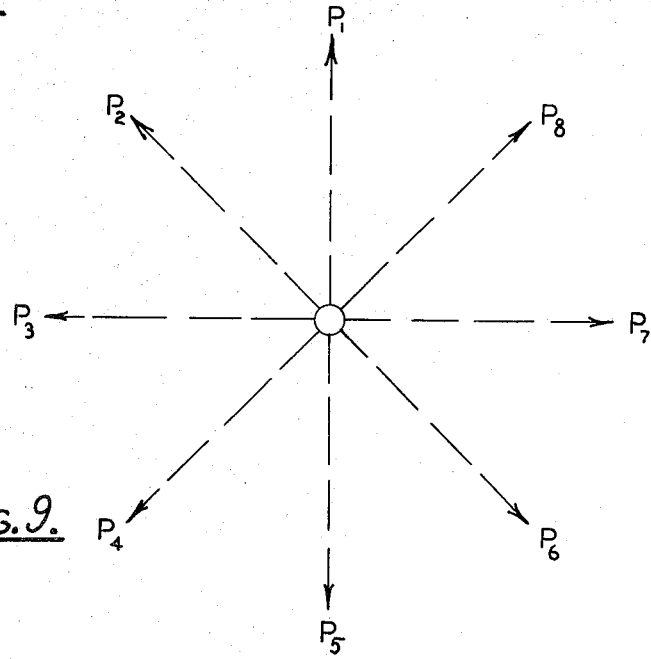
FIG. 9.

SHAKER HEAD

BACKGROUND OF THE INVENTION

The invention relates to shakers and more particularly to a mechanical shaker head for use during harvesting operations in dislodging tree-borne objects such as fruits, nuts and the like.

The prior art includes mechanical shakers of numerous designs and incorporating various modes of operations for imparting shaking motions to given trees for dislodging agricultural products, such as fruit and nut crops, as harvesting operations are conducted. Frequently, currently available mechanical shakers include an elongated boom having a clamp at its distal end, for clamping the boom to a selected tree, and a drive unit for imparting motion to the boom, whereby the trees are shaken for purposes of causing tree-borne objects to be dislodged.

Of course, as is readily apparent, no difficulty is encountered in simply generating a force sufficient to shake given trees sufficiently to dislodge objects therefrom. However, one of the difficulties most often encountered is that of imparting to trees from which crops are being harvested shock loads of a suffcient magnitude and frequency for dislodging the crop without severely damaging the bark, limbs and root systems of the trees. In attempting to overcome this perplexing problem attempts have been made to provide a shaker wherein the applied shaking force is caused to progress about the trunk of a tree being shaken. Such a shaker is illustrated in United States Pat. No. 3,221,567, issued to Brandt, Jr.

Unfortunately, the drive mechanism heretofore employed tends to be quite complex. Hence, there currently exists a need for a practical, economic and reliable shaker for use in harvesting tree-borne agricultural crops.

OBJECTS AND SUMMARY OF THE INVENTION

It is therefore an object of the instant invention to provide an improved mechanical shaker.

It is another object to provide an improved mechanical shaker head for use in the harvesting of crops grown by trees.

It is another object to provide a mechanical shaker head which includes force generating means for imparting vibratory motion to crop-bearing components of trees grown for agricultural purposes.

It is another object to provide in a mechanical shaker head a force generator system for periodically applying radially directed shock loads to the head, through 360° of stepped progression, at a frequency sufficient to dislodge selected objects from the trees.

It is another object to provide an improved mechanical shaker head having mounted therein counter-rotating masses for use in harvesting tree-borne crops whereby selected trees are shaken sufficiently for dislodging articles without subjecting the trees to damage during shaking operations.

It is another object of the instant invention to provide an improved shaker having a highly reliable, efficient, economic and practical drive unit for driving a pair of counter-rotating, coaxially related masses.

These and other objects and advantages of the instant invention are achieved through the use of a mechanical shaker head having a pivotally supported frame within which there is mounted a carriage including a selectively operable clamp adapted to grasp a selected portion of a given tree to be shaken, a force generating system including a pair of energy wheels of differing diameters driven in counter-rotation in a manner such that a common instantaneous tangential velocity is imparted to the energy wheels while the instantaneous angular velocity of the masses differs sufficiently for developing radially directed shock loads which are intermittently applied to the shaker head through 360° of stepped progression for thereby imparting vibratory motion to the given trees of a magnitude sufficient for dislodging tree-borne articles without subjecting the trees to inordinate physical damage and a drive unit for driving the force generating unit, including a dual drive-sheave having an endless Double C, Deep-notched, Double V belt trained thereabout and about the periphery of the energy wheels in a manner such that the dual drive-sheaves drive the energy wheels in opposite directions in response to unidirectional rotation imparted thereto.

BRIEF DESCRIPTION OF THE DRAWINGS

FIG. 1 is a practical view, not to scale, depicting an operative environment for a shaker head which embodies the principles of the instant invention.

FIG. 2 is a partially sectioned, front elevation of the shaker head shown in FIG. 1.

FIG. 3 is a sectioned, rear elevation taken generally along line 3—3 of FIG. 1.

FIG. 7 is a diagrammatic view of a force generating system employed by the head illustrating a pair of energy wheels and their directions of rotation as they are employed in developing and applying shock loads to the shaker head shown in FIGS. 1 through 6.

FIGS. 8A and 8B are force diagrams collectively illustrating alternate effects of the energy wheels as the wheels develop shock loads.

FIG. 9 is a diagrammatic view depicting an operative application of radially directed shock loads imparted to the shaker head of FIGS. 1 through 6, as a counter-rotation of the energy wheels occurs.

FIG. 10 is a fragmented, perspective view of a double C, deep notched, double V belt employed by the shaker of the instant invention.

DESCRIPTION OF THE PREFERRED EMBODIMENT

Figure 4:
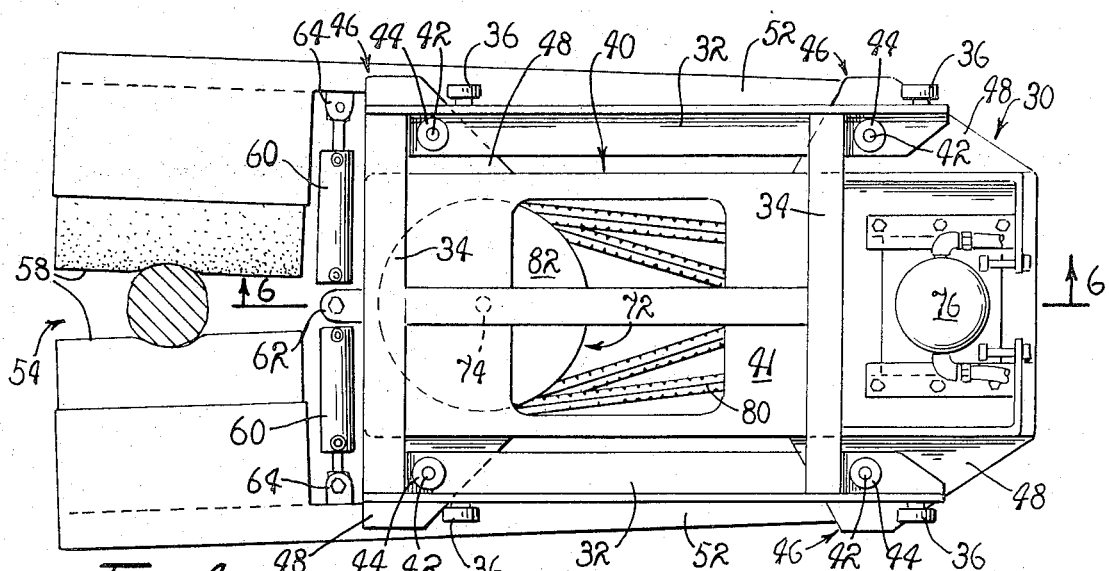
FIG. 4 is a top plan view of the shaker head.
Figure 5:
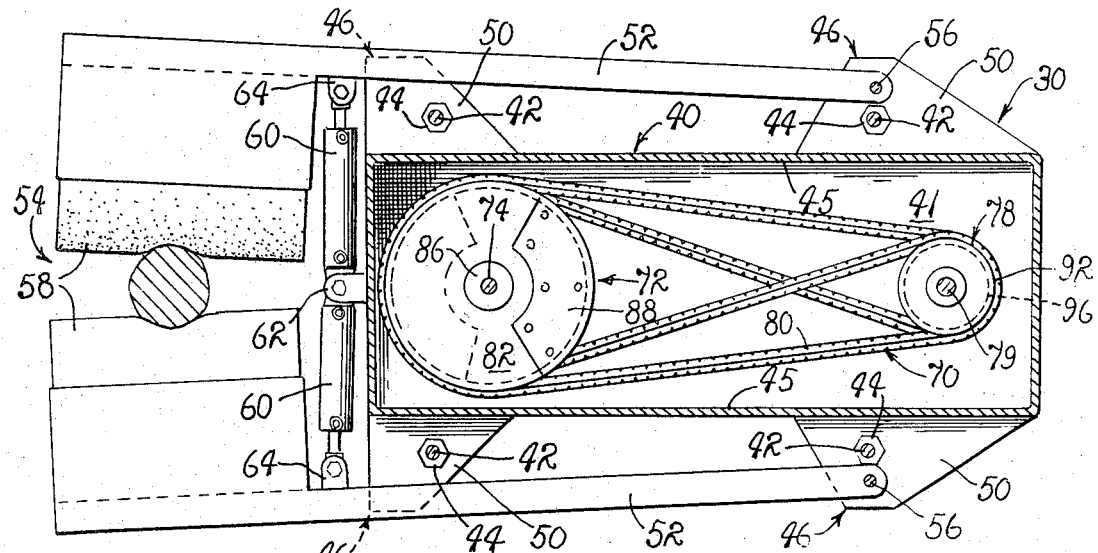
FIG. 5 is a horizontally sectioned view of the head, taken generally along line 5—5 of FIG. 3.
Figure 6:
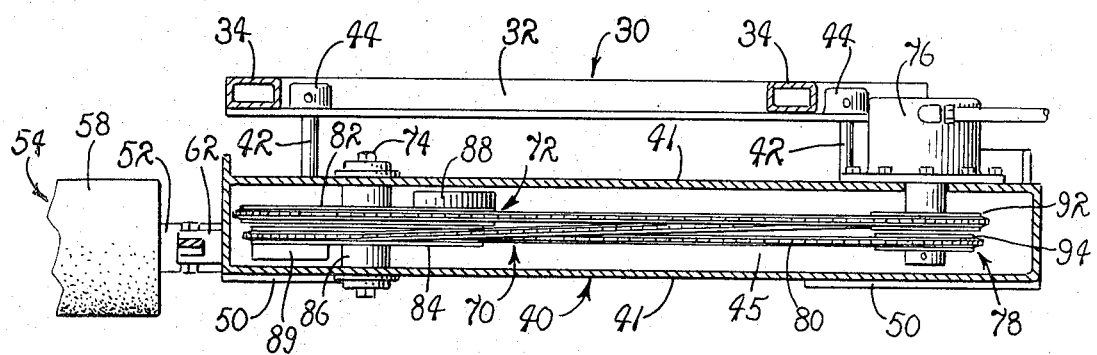
FIG. 6 is a vertically sectioned view of the head, taken generally along line 6—6 of FIG. 4.

Referring now to the drawings wherein like reference characters designate like or corresponding parts throughout the several views, there is shown in FIG. 1 a shaker head 10 which embodies the principles of the instant invention.

The shaker head 10 preferably is mounted at the distal end of a boom, generally designated 12, which normally is transported by a suitable vehicle, such as a farm tractor and the like, not shown. Since the particular vehicle upon which the boom 12 is supported forms no specific part of the instant invention, a detailed description thereof is omitted in the interest of brevity. However, it is to be understood that the boom 12 preferably is pivotally supported at its base with the shaker head 10 being mounted at the distal end thereof, in order that the shaker head 10 can operatively be united with a selected tree within a given field or orchard and employed in shaking the tree to dislodge a portion of a tree-borne crop therefrom.

The shaker head 10 includes a support frame 14 pivotally coupled by pivotal support means, including a suitable pair of pivot pins 16, only one of which is shown, with a mounting bracket 18 coupled with the boom 12 at its distal end. If so desired, the bracket 18 can be coupled with the boom 12 in a manner such that the frame 14 is afforded rotation about the longitudinal axis of symmetry of the boom.

In practice, the frame 14 includes a pair of U-shaped extrusions horizontally extended to form channel members 20. The members 20 are disposed in a coplanar relationship and are united through a plurality of transversely extended support beams 22. Thus the extrusions and support beams 22, collectively, form the support frame 14.

To each of the channel members 20 there is welded or otherwise affixed an upstanding arm 24 to which is pivotally coupled a distal end of an output shaft 26 axially extended from an hydraulic actuator 28 and supported for rectilinear reciprocation. Each of the hydraulic actuators 28, in turn, is pivotally coupled at its base to the bracket 18 in a manner such that substantially vertical oscillation is imparted to the support frame 14, about the pair of pivot pins 16, as the shaft 26 is reciprocated through an energization of the actuators 28. It is, therefore, to be understood that that position of the support frame 14 relative to a horizontal plane can be varied simply by energizing the actuators 28 for pivotally displacing the frame 14 about the pair of pivot pins 16. Additionally, it is to be understood that the support frame 14 preferably is afforded rotation about the longitudinal axis of symmetry of the boom 12 in order to assist an operator in positioning the shaker head 10 relative to a given component of a selected tree, prior to performing a shaking operation.

Within the support frame 14 there is supported, for rectilinear motion, a carriage generally designated 30. The carriage 30 includes a pair of coplanar, parallel rails 32 joined together by a plurality of transverse support beams 34 for coupling the carriage into a rugged integrated unit. The rails 32 are arranged in parallelism at the inboard side of the channels 20 and serve as supports for a plurality of casters 36. The casters 36 preferably are mounted on bearing pins 38 laterally extended from the rails 32 and are fixed thereto in any suitable manner, as by welding and the like.

The casters 36 are received within the channel members 20 so that the carriage 30, in effect, is supported for limited rectilinear motion with respect to the support frame 14 and the boom 12. Within the carriage 30 there is provided a housing 40, partially defined by a vertically spaced pair of horizontal plates 41, suspended from the rails 32 by a plurality of hangers 42. In practice, the hangers 42 are formed as pins having screw-threaded portions which serve to receive washers, not shown, and nuts 44.

As illustrated, the housing 40 further includes side plates 45 which, in cooperation with the plates 41, impart a substantially rectangular configuration to the housing 40. From the side plates 45 there are laterally extended mounting brackets, generally designated 46, through which the hangers 42 are extended and to which the hangers are anchored. In practice, a mounting bracket 46 is located at each of the four corners of the housing 40. Of course, the housing 40 is of a suitable configuration and therefore the particular arrangement and configuration of the mounting bracket 46 are varied in accordance with the particular configuration of the housing 40. As currently employed, each of the mounting brackets 46 includes a pair of vertically spaced pair of plates arranged in laterally extended parallel planes, including an upper plate 48 and a lower plate 50, as best shown in FIG. 3.

Between the upper and lower plates 48 and 50, respectively, of each of the rearmost mounting brackets 46, there is pivotally supported an arm 52 of a forwardly extended tree-clamp 54. The clamp 54, in practice, is afforded a scissor motion and serves to couple the shaker head 10 with a selected portion of a given tree, in a clamping action, as illustrated in FIGS. 1 and 2.

Each of the arms 52 is pinned to a rearmost mounting bracket 46 by a vertically oriented bearing pin 56 extended between the upper and lower plates 48 and 50 of the bracket and passed through a suitable opening formed in the base portion of the arm 52 for thus pivotally pinning the arm to the mounting bracket. Since the mounting brackets 46 are in a coplanar relationship, it is to be understood that the arms 52 are supported for oscillation in a coplanar relationship whereby the clamp 54 is configured to receive, at its distal end, a selected component of a given tree. The distal ends of the arms 52 are provided with suitable pads 58 which engage the surface of a selected component of a tree without disturbing its bark. Since the particular pad employed forms no specific part of the instant invention, a detailed description is omitted in the interest of brevity.

The upper and lower plates 48 and 50, of the forwardmost mounting brackets 46, located at opposite sides of the forwardmost end of the housing 40, serve as support plates for supporting the arms 52 as the arms are oscillated in a coplanar relationship for clamping and releasing a component of a given tree. Thus the arms 52 of the clamp 54 are guided by the plates 48 and 50, of the forwardmost mounting brackets 46, into and out of operative engagement with a tree component as the component is clamped and released by the pads 58. The throw of the arms 52 is controlled by a pair of hydraulic actuators 60 pivotally coupled at their bases by suitable clevis couplings 62, with the output shafts thereof being substantially oppositely directed and pinned to the arms 52 by a pair of clevis couplings 64. Since the mounting of the actuators 60 forms no part of the invention, a detailed description thereof is omitted. However, it is to be understood that as the actuators 60 are activated, their output shafts are displaced in axial directions for angularly displacing the arms 52 about the bearing pins 56. Of course, it will be further understood that the actuators 60 are coupled with a suitable source of pressurized hydraulic fluid selectively delivered in a suitable manner.

Vibratory motion is imparted to the head 10 through energization of a force generating system 70 contained within the housing 40. The force generating system 70 serves to deliver to the head 10 a series of suddenly applied force loads in substantially horizontal planes, hereinafter referred to as "shock."

The force generating system 70 includes an energy wheel unit 72 supported within the housing 40 by a suitable bearing structure including a bearing pin 74 coupled at its opposite ends to the plate 41. The unit 72 is, in operation, driven by a suitably powered hydraulic motor 76, through a dual-sheave drive unit 78, supported by a drive shaft 79 coupled with the motor 76, and a V-belt 80 which, in practice, is a commercially available double C, deep notched, double V belt. These belts are so classified because of the severity of the included angle of the V, the deep notches and the back-to-back V-shaped configuration.

The energy wheel unit 72 includes an upper energy wheel 82 of a suitable diameter and a lower energy wheel 84 of a diameter substantially less than the diameter of the upper energy wheel 82. The energy wheels 82 and 84 are supported in coaxial alignment on the bearing pin 74 by suitable bearing collars 86. These collars are of a suitable design and are received by the bearing pin 74 in supporting relationship with the energy wheels 82 and 84 for supporting the energy wheels in free rotation on the bearing pin. Since the collars 86 are of any suitable design, a detailed description thereof is omitted in the interest of brevity. However, it is to be understood that the collars 86 serve to impart axial support to the energy wheels as they are driven in counter-rotation by the belt 80.

Each of the energy wheels 82 and 84, as best illustrated in FIG. 3, is provided with an eccentric mass mounted in spaced relation with the center of the wheel. As shown, the energy wheel 82 is provided with a mass 88 while the energy wheel 84 includes a mass 89. The masses 88 and 89 preferably are of an arcuate configuration and are bolted or otherwise secured to the peripheral portions of the energy wheels. Consequently, the masses 88 and 89 are afforded lever arms of differing lengths extending from their centers of gravity to the axis of rotation of the energy wheels so that upon being rotated at a given angular velocity the masses develop determinable forces.

Each of the energy wheels 82 and 84 is circumscribed by a V-belt channel 90 which receives therein the V-belt 80 as the belt is driven in rotation by the dual-sheave drive unit 78. The dual-sheave drive unit 78, in turn, includes an upper sheave 92 and a lower sheave 94. The periphery of each of the sheaves 92 and 94 also includes an annular V-shaped channel, designated 96, for receiving therein the V-belt 80. It should, therefore, readily be apparent that as the hydraulic motor 76 is activated, the dual-sheave drive unit 78 imparts rotation to the energy wheel unit 72 through the belt 80. It should, likewise, readily be apparent that the V-belt channels 90 and 96 are of a V-shaped configuration for receiving therein eier side of the V-belt 80.

Since the V-belt 80 is, in practice, a double V belt, it is possible to reliably establish a drive coupling between the belt 80, the dual-sheave drive unit 78 and each of the energy wheels 82 and 84 for thereby enhancing the operation of the shaker unit. Furthermore, and quite importantly, it has, in practice, been found that preferably a notched belt is employed, since each of the sheaves 92 and 94 of the drive unit 78 is heavily relied upon to perform a driving function for effectively driving the unit 72. This driving function of the dual-sheave unit 78, in turn, tends to twist and dismount belts not equipped with notches.

The direction in which the upper and lower energy wheels 82 and 84, respectively, are driven is, of course, dictated by the direction in which the belt 80 is trained thereabout. As best shown in FIG. 7, the belt 80 is trained about the upper drive sheave 92, then about the upper energy wheel 82, thence downwardly and about the lower drive sheave 94 and diagonally back to the lower energy wheel 84 and thence diagonally back to the upper drive sheave 92 so that, in effect, both of the drive sheaves of the dual-sheave drive unit 78 are driven in a common direction, while the energy wheels 82 and 84 of the energy wheel unit 72 are driven in opposite directions for imparting thereto mutual counter-rotation.

Since the upper sheave 92 and the lower sheave 94 are of a common diameter, it is apparent that the V-belt 80 is driven at a uniform speed, determined by the instantaneous tangential velocity of the sheaves, that is to say, the instantaneous velocity points located along peripheral surfaces of the sheaves 92 and 94.

As hereinbefore mentioned, the upper energy wheel 82 and the lower energy wheel 84 are of differing diameters. Since both of the energy wheels 82 and 84 are driven by a belt 80, it is apparent that they are driven at a common instantaneous tangential velocity, while the instantaneous rate of angular displacement, of the energy wheels 82 and 84 differs to an extent dictated by the differences in their diameters. Consequently, it is to be understood that the angular velocity of the smaller energy wheel is greater than that of the larger energy wheel so that the mass 89 affixed to the smaller energy wheel is caused to be angularly displaced through a greater distance during a given time period than the mass 88 affixed to the larger energy wheel. Accordingly, it should readily be apparent that the centers of gravity for the masses 88 and 89 are brought into a coplanar relationship in stepped progression, advancing through 360°, about the axis of rotation for the energy wheel unit 72.

Of course, as is well recognized, a force developed by a mass located at an end of a moment arm rotating about a fixed axis of rotation has a centrifugal force vector extending outwardly from the axis. Hence, when the rotating eccentric masses 88 and 89 are brought into diametrically opposed alignment at opposite sides of the center of the axis of rotation for the unit 72, one force may be deemed to be a positive force while the other is a negative force, as they act in opposition, for substantially cancelling their effect, as illustrated in FIG. 8A. Since the energy wheels are driven in counter-rotation, the eccentric masses 88 and 89 rapidly are brought into coplanar alignment, at one side of the center of the unit 72, whereby the moment arms for the forces are substantially coincident, whereupon the forces assume a common sign and thus the resulting applied force is maximized, as illustrated in FIG. 8B. It is at this instant that shock is applied to the shaker head 10.

Since the masses 88 and 89 are brought into coplanar alignment in stepped progression about the axis of rotation for the energy wheel unit 72, for reasons hereinbefore described, shock is applied to the shaker head 10 in stepped progression through 360°, as illustrated by successive points designated $P_1$ through $P_8$, in FIG. 9. Of course, the points designated $P_1$ through $P_8$ are illustrative only, and the points at which shock is applied to the head 10 are quite numerous, the number being determined by the ratio of the angular velocities of the energy wheels 82 and 84.

It should be appreciated that since shock is applied to the shaker head 10 in stepped progression through 360° as the energy wheels are driven in rotation at differing angular velocities the shock is transmitted through the clamp 54 to components of trees to which the clamp is affixed.

OPERATION

It is believed that in view of the foregoing description, the operation of the device will be readily understood and it will be briefly reviewed at this point.

In order to employ the shaker head 10, which embodies the principles of the instant invention, the shaker head is positioned adjacent a selected component of a tree to be shaken, by properly positioning the boom 12 and manipulating the frame 14, by means of the actuator 28. Once properly positioned, the clamp 54 is closed, as illustrated in FIG. 1, by retracting the shafts of the actuators 60 so that the clamp 54, in effect, joins the shaker head 10 with the tree to be shaken.

At a selected instant the force generating system 70 is activated by energizing the motor 76, whereupon the energy wheels 82 and 84 are driven in counter-rotation by the dual-sheave drive unit 72 so that the eccentric masses 88 and 89 are accelerated to an instantaneous angular velocity such that the eccentric mass 88 affixed to the energy wheel 82 is caused to progress through a smaller angular distance, during a given time period, than the eccentric mass 89 affixed to the smaller energy wheel 84. Consequently, the masses 88 and 89 are brought into diametrically opposed alignment, as illustrated in FIG. 8A, wherein the centrifugal forces thus developed tend to cancel. However, as counter-rotation of the energy wheels 82 and 84 continues, the masses 88 and 89 are brought, quite rapidly, into coplanar alignment at one side of their axis of rotation so that their moment arms are in effect, coincident, whereupon the centrifugal forces thus developed serve to apply shock to the frame 14 through the bearing pins 74. As counter-rotation of the energy wheels is continued, the eccentric masses 88 and 89 again are brought into diametrically opposed, and cancelling relationship. Of course, continued rotation of the energy wheels again causes the masses 88 and 89 to be brought into a coplanar relationship.

Since the masses 88 and 89 are brought into coplanar alignment at successive points about the axis of rotation, shock is applied to the shaker head 10 by the eccentric masses in stepped progression and this shock is transmitted through the clamp 54 to the tree to which the head 10 is attached.

It is, of course, to be appreciated that the masses 88 and 89, collectively, apply shock to the shaker head 10 for transmitting vibratory motion to a given tree. Consequently, the masses can, where desired, be rotated in a common direction. However, in such event, the vibratory motion necessarily will be less severe for reasons which are believed to be readily apparent.

In view of the foregoing, it should readily be apparent that the shaker head of the instant invention provides a practical, economic and efficient device for imparting vibratory motion to trees, particularly those utilized in producing agricultural crops, without damaging the trees.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In a mechanical shaker head for use in dislodging tree-borne objects, the improvement comprising:
a pair of coaxially related energy wheels having relatively different diameters supported for free rotation by a common bearing pin, a pair of masses, each mass of said pair being affixed to one of said energy wheels adjacent a peripheral segment thereof, a drive unit including a drive shaft supported for driven rotation in spaced parallelism with said bearing pin, means including an hydraulic motor coupled to said drive shaft for imparting to the drive shaft a predetermined rate of driven rotation, a pair of commonly dimensioned coaxially related drive sheaves rigidly mounted on said drive shaft, an endless, deep-notched double-V belt trained in a common direction about the periphery of said drive sheaves and trained in opposed directions about said energy wheels for imparting thereto opposed directional rotation at common instantaneous tangential velocities, whereby the masses are driven in counterrotation at relatively different angular velocities for periodically applying radially directed shock forces to said shaker head through 360° of stepped progression.

2. The improvement of claim 1 further comprising:
A. a frame pivotally coupled at its base to the distal end of a supporting boom;
B. a carriage supported for rectilinear reciprocation within said frame;
C. a selectively operable clamp, including a pair of pivotally supported clamping arms extended from said carriage, and a pair of coaxially related, fluid driven actuators coupled to said arms for imparting pivotal motion to the arms for operatively grasping a selected portion of a given tree; and
D. means mounting said bearing pin and said drive shaft within said carriage.

3. The improvement of claim 2 further comprising:
means for selectively varying the angular position of said frame relative to a horizontal plane.

4. A shaker head for use in dislodging tree-borne objects comprising:
A. means defining a housing adapted to be mounted at the distal end of a shaker beam;
B. a pair of energy wheels, each having an eccentric mass affixed thereto near the periphery thereof;
C. means for supporting the energy wheels within said housing for rotation about a common axis in substantially parallel planes, including a shaft affixed at its opposite ends to said housing and bearing means mounting said pair of energy wheels on said shaft for free rotation between the opposite ends thereof;
D. means for simultaneously imparting dissimilar rates of opposed angular velocities to said wheels, whereby vibratory motion is imparted to the housing through said shaft;
E. means defining a pair of arms extended forwardly from the opposite sides of said housing for gripping between the distal end portions thereof a selected portion of a given tree;

F. means supporting at least one arm of said pair of arms for pivotal motion about its base, whereby said arm is adapted to be displaced from a diverging relationship with the other arm of said pair into a substantially parallel relationship therewith for gripping between the distal end portions thereof a selected portion of a given tree; and G. means including a hydraulic ram having a barrel pivotally coupled at its base to said housing and an axially reciprocable output shaft connected at its distal end to said arm for imparting pivotal displacement to the arm as rectilinear motion is imparted to the shaft.

* * * * *

UNITED STATES PATENT OFFICE
CERTIFICATE OF CORRECTION

Patent No. 3,780,510　　　　　　　　Dated December 25, 1973

Inventor(s) Neil R. Tompkins

It is certified that error appears in the above-identified patent and that said Letters Patent are hereby corrected as shown below:

In the Specification:

Column 2, line 24, delete "practical" and insert

---pictorial---.

Column 5, line 2, delete "plate" and insert ---plates---;
line 52, delete "eier" and insert ---either---.
Column 6, line 23, after "instantaneous" insert ---angular velocity, that is to say, the instantaneous---.

Signed and sealed this 16th day of April 1974.

(SEAL)
Attest:

EDWARD M. FLETCHER, JR.　　　　　　C. MARSHALL DANN
Attesting Officer　　　　　　　　　　Commissioner of Patents